United States Patent [19]

Umeda

[11] Patent Number: 4,536,810
[45] Date of Patent: Aug. 20, 1985

[54] ADAPTER FOR A MINIATURE TYPE TAPE CASSETTE

[75] Inventor: Hiroyuki Umeda, Yokohama, Japan

[73] Assignee: Victor Company of Japan, Ltd., Yokohama, Japan

[21] Appl. No.: 322,767

[22] Filed: Nov. 19, 1981

[30] Foreign Application Priority Data

Nov. 25, 1980 [JP] Japan ................................ 55-164705
Nov. 25, 1980 [JP] Japan ............................ 55-167532[U]
Aug. 13, 1981 [JP] Japan ............................ 56-119403[U]

[51] Int. Cl.³ ............................................. G11B 23/04
[52] U.S. Cl. ................................. 360/94; 360/130.21; 360/96.3; 242/199
[58] Field of Search ................. 360/94, 95, 130.21, 360/130.2, 96.1, 96.3, 132; 242/197, 198, 199, 200

[56] References Cited

U.S. PATENT DOCUMENTS

| | | | |
|---|---|---|---|
| 4,185,307 | 1/1980 | Sato | 360/94 |
| 4,432,510 | 2/1984 | Ogata | 360/94 |
| 4,476,505 | 10/1984 | Ogata | 360/94 |
| 4,477,850 | 10/1984 | Ogata | 360/94 |

FOREIGN PATENT DOCUMENTS

| | | |
|---|---|---|
| 0031927 | 7/1981 | European Pat. Off. . |
| 1913507 | 11/1969 | Fed. Rep. of Germany . |
| 2427176 | 6/1974 | Fed. Rep. of Germany . |
| 1248289 | 9/1971 | United Kingdom . |
| 1312282 | 4/1973 | United Kingdom .......... 360/94 |
| 1450744 | 7/1976 | United Kingdom . |
| 1507283 | 4/1978 | United Kingdom . |
| 1507150 | 4/1978 | United Kingdom . |
| 2019356 | 10/1979 | United Kingdom . |

*Primary Examiner*—Alan Faber
*Attorney, Agent, or Firm*—Louis Bernat

[57] ABSTRACT

An adapter for a miniature type tape cassette which has an external form and size smaller than those of a standard type tape cassette, where the miniature type tape cassette is used with a recording and/or reproducing apparatus of a type different from a standard type recording and/or reproducing apparatus for performing recording and/or reproduction when loaded with the standard type tape cassette. The adapter comprises an adapter case having an external form and size substantially equal to those of the standard type tape cassette, an accommodating part for accommodating the miniature type tape cassette, and a tape guiding member provided within the adapter case, for guiding a tape drawn out from the miniature type tape cassette so as to form a predetermined tape path within the adapter case.

15 Claims, 21 Drawing Figures

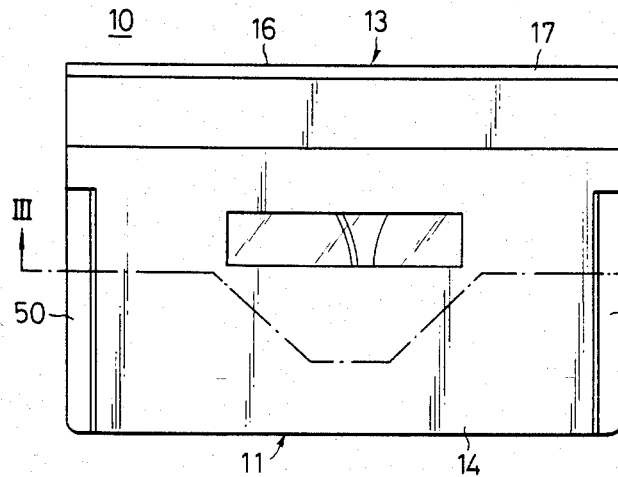
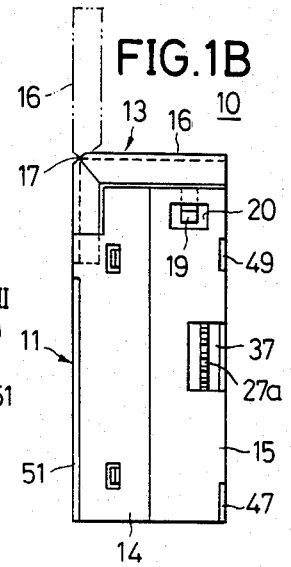
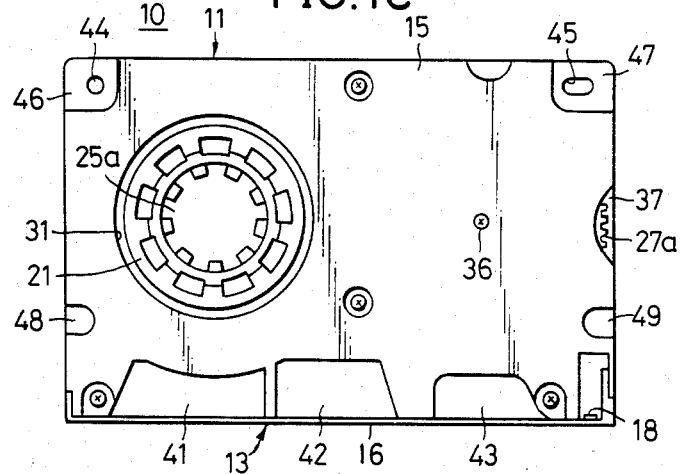
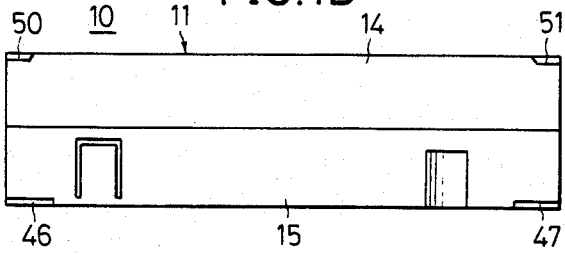

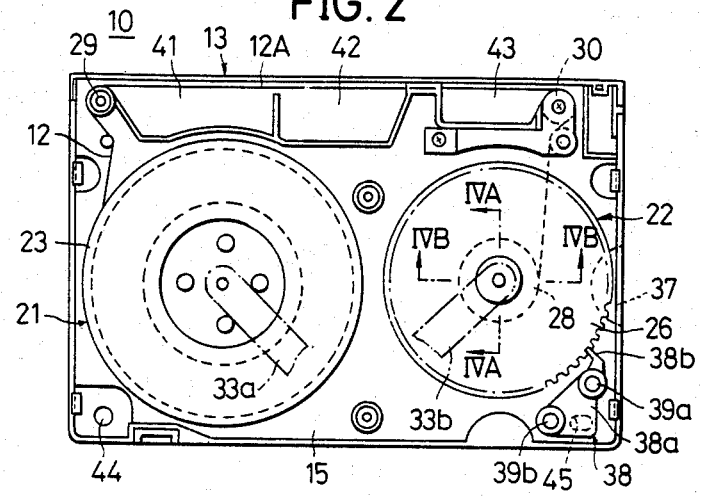
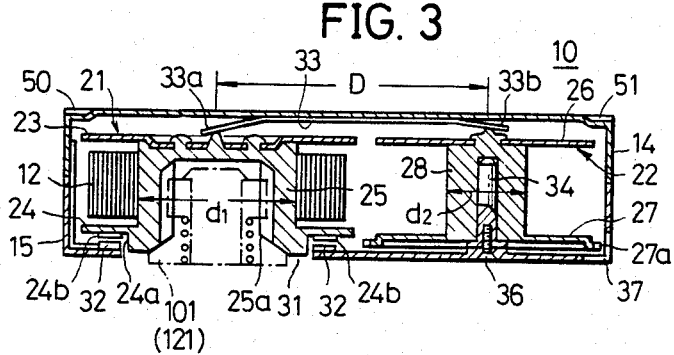

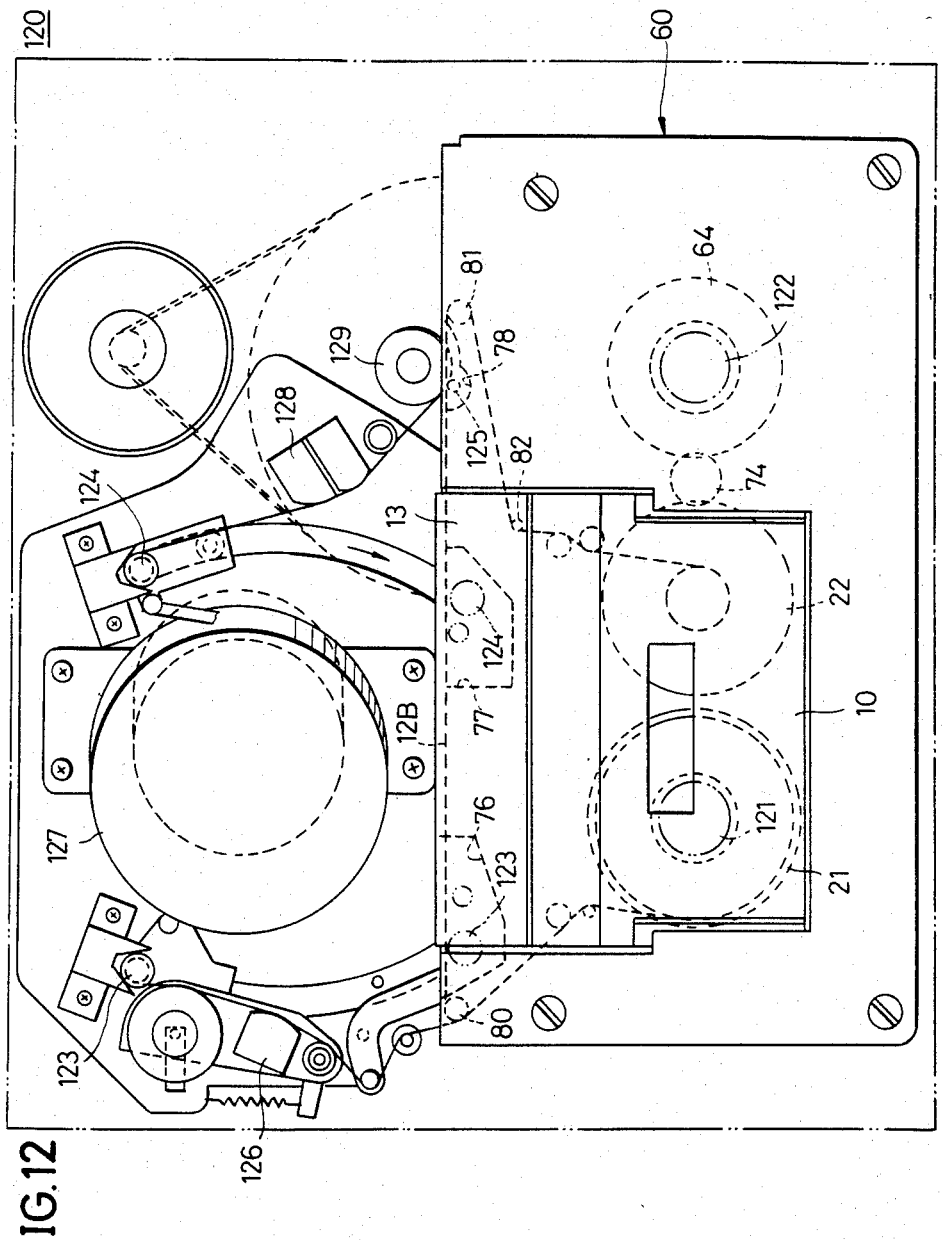

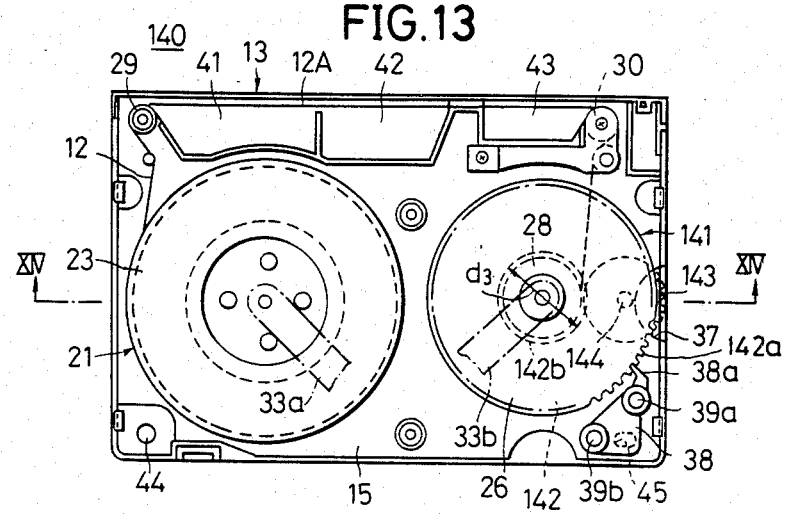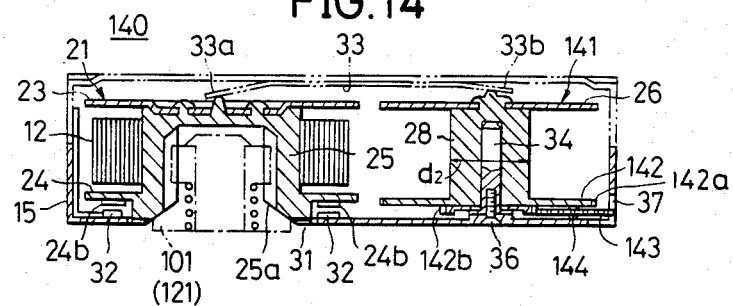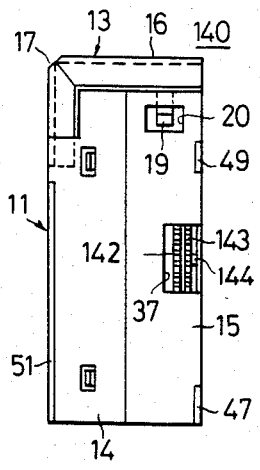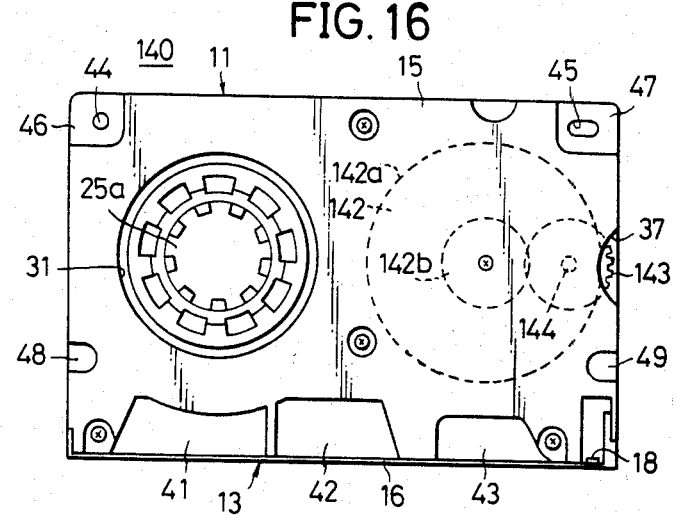

ADAPTER FOR A MINIATURE TYPE TAPE CASSETTE

BACKGROUND OF THE INVENTION

The present invention generally relates to adapters for miniature type tape cassettes, and more particularly to an adapter having an external form and size equal to those of a standard type tape cassette used with a standard type recording and/or reproducing apparatus, which is loaded into the standard type recording and/or reproducing apparatus in a state accommodating a miniature type tape cassette which is smaller than the standard type tape cassette and loaded independently into a recording and/or reproducing apparatus of a type different from the standard type recording and/or reproducing apparatus.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, interchangeability exists between apparatuses adopting the same standard. Accordingly, a tape cassette recorded by one recording and/or reproducing apparatus can be reproduced by another recording and/or reproducing apparatus of the same standard. Hence, in order to ensure interchangeability between different recording and/or reproducing apparatuses manufactured by different manufacturers so as to perform recording and/or reproduction, a standardization is set with respect to formats of the tape cassette and the recording and/or reproducing apparatus. That is, the above formats are standardized for each standard, and a standard type tape cassette and a standard type recording and/or reproducing apparatus are respectively provided and employed for each standard.

Recently, a problem of much importance involves the realization in reducing the size of the recording and/or reproducing apparatus main body. This is to realize a more compact portable type recording and/or reproducing apparatus, and, for example, to realize such an equipment that a recording apparatus is unitarily built into a television camera.

In this regard, some attempts have been made to realize a compact type recording and/or reproducing apparatus using a compact or miniature type tape cassette, which uses a tape pattern and format completely different from those of the standard type recording and/or reproducing apparatus using the standard type tape cassette which are already and widely accepted in the market. However, the above compact type recording and/or reproducing apparatus attempted for realization uses a format completely different from that of the standard type recording and/or reproducing apparatus, and interchangeability does not exist therebetween. Therefore, in this compact type recording and/or reproducing apparatus, there is a disadvantage in that a tape cassette recorded by the compact type recording and/or reproducing apparatus cannot be reproduced by the standard type recording and/or reproducing apparatus. This is a great inconvenience and disadvantage to the owners of the compact type recording and/or reproducing apparatus.

Another attempt has also been made to realize a compact type portable recording and/or reproducing apparatus which performs recording and/or reproduction with the same tape pattern and format as the standard type recording and/or reproducing apparatus, by using a tape cassette whose size is slightly reduced by reducing the tape quantity and the diameter of the reels from those of the standard type tape cassette. In this system, a tape cassette recorded by the portable recording and/or reproducing apparatus can be reproduced as it is by the standard type recording and/or reproducing apparatus.

However, in the tape cassette used in the above portable recording and/or reproducing apparatus, the distance between a supply side reel and a take-up side reel is set equal to the distance between the supply side and take-up side reels of the standard type tape cassette, so that the tape cassette used for the portable recording and/or reproducing apparatus can be loaded into the standard type recording and/or reproducing apparatus. Hence, even when the tape quantity is reduced in order to reduce the diameter of the reels, there is a limit in reducing the diameter of these reels. Therefore, in this system, there was a disadvantage in that the size of the tape cassette as a whole could not be reduced significantly, and the same is true to the recording and/or reproducing apparatus.

Furthermore, another system can be considered in which the tape quantity is reduced to reduce the diameter of the reels, and further, the miniature type tape cassette is constructed by reducing the distance between the supply side and take-up side reels. In this system, as a modification of the standard type recording and/or reproducing apparatus, the recording and/or reproducing apparatus can be constructed so that a reel disc for driving the take-up side reel is movable. In this modification of the standard type recording and/or reproducing apparatus, the take-up side reel disc is at a normal position when loaded with the standard type tape cassette, and the take-up side reel disc is moved to a position closer to the supply side reel disc when loaded with the miniature type tape cassette.

However, even in this system, for example, there is a disadvantage in that the miniature type tape cassette recorded by the compact type recording and/or reproducing apparatus cannot be reproduced by the standard type recording and/or reproducing apparatus which is presently in wide use. Moreover, there is a disadvantage in that it is extremely difficult to realize a mechanism for moving the reel disc in the manner described above. Furthermore, the recording and/or reproducing apparatus using the tape cassette generally has a mechanism for drawing out the tape from within the tape cassette to load the tape onto a predetermined tape path within the recording and/or reproducing apparatus. Therefore, it is also exceedingly difficult to construct the above mechanism for pulling out the tape, so that interchangeability exists with respect to the above compact or miniature type tape cassette and the standard type tape cassette, and the realization of such a mechanism is virtually impossible.

SUMMARY OF THE INVENTION

Accordingly, it is a general object of the present invention to provide a novel and useful adapter for a miniature type tape cassette which enables the miniature type tape cassette to be loaded into a standard type recording and/or reproducing apparatus, and in which the above described disadvantages have been overcome.

Another and more specific object of the present invention is to provide an adapter having an external form and size equal to those of a standard type tape cassette used with a standard type recording and/or reproducing apparatus, which is loaded into the standard type recording and/or reproducing apparatus in a state accommodating a miniature type tape cassette which is smaller than the standard type tape cassette and loaded independently into a recording and/or reproducing apparatus of a type different from the standard type recording and/or reproducing apparatus. According to the adapter of the present invention, the above miniature type tape cassette used with respect to the recording and/or reproducing apparatus of the different type can also be loaded into the standard type recording and/or reproducing apparatus.

Still another object of the present invention is to provide an adapter which accommodates a miniature type tape cassette in a state where a tape drawn out from a miniature type tape cassette case is guided so that a tape path part at the inner part on the front surface of the adapter becomes substantially identical to a tape path part at the inner part on the front surface of the standard type tape cassette.

Another object of the present invention is to provide an adapter constructed to accommodate a miniature type tape cassette so that when the adapter is loaded into the standard type recording and/or reproducing apparatus, one reel driving shaft of the apparatus directly engages with one reel of the tape cassette and the other reel driving shaft engages with the adapter to transmit rotation to the other reel of the tape cassette from the side of a cassette case through a rotation transmitting mechanism provided in the adapter.

Other objects and further features of the present invention will be apparent from the following detailed description when read in conjunction with the accompanying drawings.

BRIEF DESCRIPTION OF THE DRAWINGS

FIGS. 1A through 1D respectively are a plan view, a side view, a bottom view, and a rear view, showing an example of a miniature type tape cassette which is accommodated within an adapter according to the present invention;

FIG. 2 is a plan view showing the miniature type tape cassette shown in FIG. 1A in a state where the upper half of the miniature type tape cassette is removed;

FIG. 3 is a perspective view showing a cross section of the miniature type tape cassette along a line III—III in FIG. 1A;

FIG. 4 is an enlarged view showing a braking mechanism part of the take-up side reel shown in FIG. 2;

FIG. 5 is a perspective view, in cross section, showing the braking mechanism shown in FIG. 4 along a line V—V;

FIG. 12 is a plan view showing an example of a standard type recording and/or reproducing apparatus which operates together with the adapter loaded with the miniature type tape cassette shown in FIG. 9, in a state where the standard type recording and/or reproducing apparatus is in a recording or reproducing mode;

FIG. 13 is a plan view showing an example of a miniature type tape cassette accomodated within a second embodiment of an adapter according to the present invention in a state where an upper half of the tape cassette is disassembled;

FIG. 14 is a cross-sectional diagram along a line XIV—XIV in FIG. 13;

FIGS. 15 and 16 are a side view and a bottom view respectively showing the miniature type tape cassette shown in FIG. 13;

DETAILED DESCRIPTION

Figure 6:
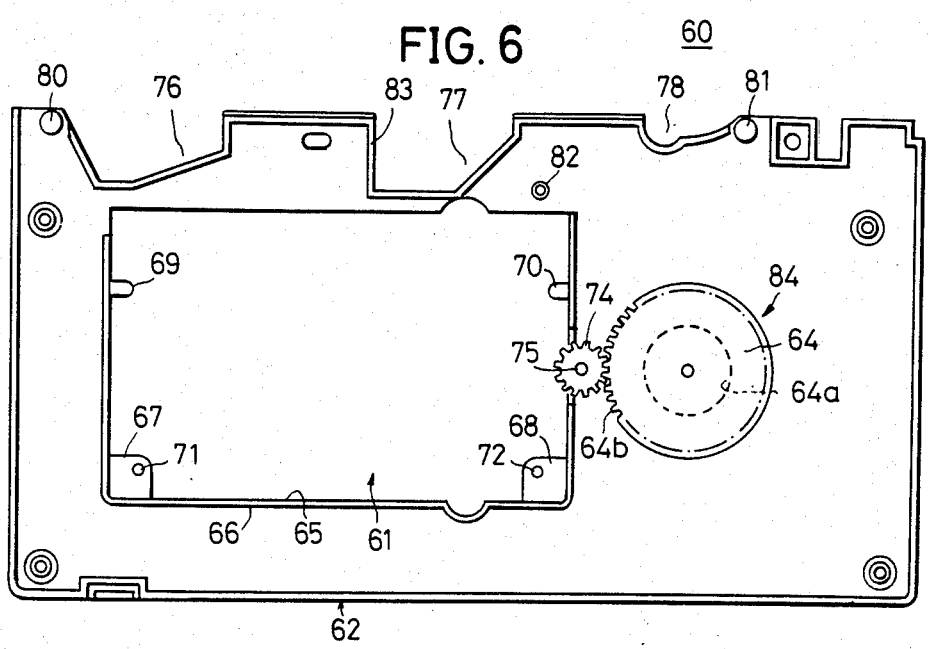
FIGS. 6 and 7 are a plan view and a bottom view respectively showing a lower half of an embodiment of an adapter according to the present invention which is loaded with the miniature type tape cassette shown in FIG. 1A.

First, description will be given with respect to an embodiment of an adapter for a miniature type tape cassette according to the present invention.

However, before describing the above adapter according to the present invention, description will be given with respect to a miniature type tape cassette which can be applied to the above adapter.

A miniature type tape cassette 10 is shown in FIGS. 1A through 1D, 2, and 3. The tape cassette 10 comprises a cassette case 11 having a size smaller than a standard type tape cassette which is loaded into a standard type video signal recording and/or reproducing apparatus. A lid 13 is provided on the front surface of the cassette case 11 in a manner such that the lid 13 can freely open and close, to protect a magnetic tape 12 accommodated within the tape cassette 10.

The cassette case 11 consists of an upper half 14 and a lower half 15. The lid 13 is moulded from a resin such as polypropylene, for example, and is mounted to the upper half 14. A front lid portion 16 of the lid 13 can rotate about a hinge portion 17 provided at the thinly moulded corner part of the lid 13. The above front lid portion 16 is urged by a leaf spring 18 towards a lid closing direction, to cover the front surface of the cassette case 11. When the tape cassette 10 is not loaded into a tape cassette adapter and a video signal recording and/or reproducing apparatus exclusively for the tape cassette 10 (description on these adapter and apparatus will be given hereinafter), the front lid portion 16 covers the front surface of the cassette case 11 to protect the magnetic tape 12 exposed with respect to this surface. Furthermore, a finger 19 formed on the front lid portion 16 engages with an opening 20 of the lower half 15, and the front lid portion 16 is thus locked in a closed state.

In addition, as shown in FIGS. 2 and 3, a supply side reel (supply reel) 21 and a take-up side reel (take-up reel) 22 are provided in a parallel manner inside the cassette case 11. A distance D between respective centers of the supply and take-up reels 21 and 22, is shorter than the distance between centers of the supply and take-up reels of the standard type tape cassette used in the standard type recording and/or reproducing apparatus. With respect to the supply reel 21, the magnetic tape 12 is wound around a reel hub 25 between upper and lower flanges 23 and 24. Similarly, with respect to the take-up reel 22, the magnetic tape 12 is wound around a reel hub 28 between upper and lower flanges 26 and 27. The magnetic tape 12 is pulled out from the supply reel 21 and guided by guide poles 29 and 30 respectively provided on the left and right end sides along the front surface side of the cassette case 11, to form a tape path 12A reaching the take-up reel 22.

The supply reel 21 is provided in a state where a projecting step portion 24a of the lower flange 24 is loosely fitted into a hole 31 having a large diameter of the lower half 15. Moreover, teeth 24b are formed in a ring shape on the lower surface of the lower flange 24 around the entire circular periphery thereof. Teeth 32 are formed in a ring shape on the upper surface of the lower half 15, at positions opposing the above teeth 24b. The supply reel 21 is urged towards the side of the lower half 15, by one arm portion 33a of a leaf spring 33 mounted on the lower surface of an upper plate of the upper half 14. Accordingly, in a normal state, the teeth 24b mesh with the teeth 32. Hence, the supply reel 21 is controlled and prevented from rotating, due to the above meshing of the teeth 24a and 32.

A reel driving shaft inserting part 25a is provided on the inner side of the reel hub 25 of the supply reel 21, into which a reel driving shaft of the recording and/or reproducing apparatus is inserted. The inner diameter of the above reel hub 25 is equal to the inner diameter of the reel hub of the supply reel in the standard type tape cassette. The reel shaft inserting part 25a is open on the side of the above hole 31.

The take-up reel 22 is provided in a rotatable manner such that a fixed shaft 34 embeddedly provided on the lower half 15 is inserted into a center hole of the reel hub 28. A center projection provided on the flat flange 26 is pushed by another arm portion 33b of the leaf spring 33 towards the downward direction, and the take-up reel 22 is urged towards the side of the lower half 15. Since the reel hub 28 is not inserted with a reel driving shaft, an outer diameter d2 of the reel hub 28 is smaller than an outer diameter d1 of the reel hub 25 of the supply reel 21. By this feature in which the outer diameter d2 of the reel hub 28 is smaller than the outer diameter d1 of the reel hub 25, the amount of magnetic tape 12 which can be accommodated within the tape cassette 10 becomes large as compared to the case where the outer diameters d1 and d2 of the reel hubs 25 and 28 are the same. Accordingly, although the size of the tape cassette 10 is small, recording and reproduction can be performed for a relatively long period of time by use of the above tape cassette 10.

The fixed shaft 34 is embeddedly fixed to the lower half 15 by a screw 36, so that the fixed shaft 34 does not rotate.

Moreover, a gear part 27a is formed on the outer peripheral part of the lower flange 27 of the take-up reel 22. As shown in FIGS. 1B, 1C, 2, and 3, a part of the gear part 27a is exposed through a cutout window 37 formed at a part between the side surface and the bottom surface of the lower half 15. The above cutout window 37 is of an arcuate shape on the bottom surface side of the lower half 15.

Furthermore, with respect to the take-up reel 22, a braking mechanism shown in FIGS. 4 and 5 is provided. A braking member 38 is supported by pins 39a and 39b on the lower half 15 which are inserted through a pair of holes provided in the braking member 38, in a freely slidable manner in the upward and downward directions. The above braking member 38 is urged downwards against the lower half by coil springs 40a and 40b fitted around the periphery of corresponding pins 39a and 39b in order to prevent the braking member 38 from slipping upwards. When the braking member 38 is urged by the coil springs 40a and 40b and is at a lowered position, a main body portion 38a of the braking member 38 closes a longitudinal hole 45 provided on the lower half 15 for positioning purpose which will be described hereinafter. Moreover, a finger portion 38b is at the same height position as the lower flange 27, and is inserted between adjacent teeth of the above gear part 27a. The take-up reel 22 is thus locked at that rotational position, and slack is not introduced in the magnetic tape 12 wound around the take-up reel 22. Moreover, the outer peripheral part of the lower flange 27 where the gear part 27a is formed, is a step lower than the flange surface at the inner peripheral side thereof.

The above braking member 38 moves upwards as will be described hereinafter, and in this raised state, the finger portion 38b disengages from the gear part 27a, and the locking operation with respect to the take-up reel 22 is accordingly released.

Openings 41 and 42 for accepting loading poles and an opening for accepting a capstan, are respectively provided in the bottom of the tape cassette 10 on the side of the lid 13. Moreover, a pair of positioning hole 44 and positioning longitudinal hole 45 are respectively provided in the bottom surface of the tape cassette 10, at left and right sides close to the rear side. These hold 44 and longitudinal hole 45 are respectively formed within depressions 46 and 47. In addition, depressions 48 and 49 are respectively formed in the bottom surface of the tape cassette 10 at the left and right sides on the side of the lid 13.

Depression 50 and 51 are formed on the left and right end sides of the tape cassette 10 shown in FIG. 1A, from substantially center position to the rear surface part thereof along the depth direction of the tape cassette 10.

Next, description will be given for a case where an adapter for a miniature type tape cassette according to the present invention is loaded into the standard type recording and/or reproducing apparatus in a state accommodating the tape cassette 10 having the above described construction, by referring to FIGS. 7 through 11.

An adapter 60 has an accommodating part 61 for accommodating the above tape cassette 10 within an adapter case 60A, and the adapter case 60A has an external form and size substantially equal to those of the standard type tape cassette.

The above adapter 60A consists of a lower half 62 and an upper half 63. The upper half 63 is fixed to the lower half 62 by screws after the tape cassette 10 is accommodated within the accommodating part 61 of the lower half 62.

The above accommodating part 61 for accommodating the above tape cassette 10 is formed as an opening at a predetermined position of the lower half 62. A rotation transmitting mechanism 84 is provided at a position adjacent to the above accommodating part 61. When the lower half 62 is placed on top of the standard type tape cassette for comparison, the supply reel 21 of the tape cassette 10 accommodated within the accommodating part 61 is arranged at a position corresponding to the position of the supply reel of the standard type tape cassette. In addition, a gear structure 64 of the rotation transmitting mechanism 84 is arranged at a position corresponding to the position of the take-up reel of the standard type tape cassette. Further, as will be described hereinafter, the tape cassette 10 is accommodated in a state where the lid 13 is open. However, the accommodating part 61 is provided at a position so that the open lid 13 does not project outside the adapter case 60A.

The accommodating part 61 consists of an opening 65 having a shape substantially identical to the shape of the tape cassette 10 shown in the plan view in FIG. 1A, a wall part 66 encircling three sides of the opening 65, and projections 67, 68, 69, and 70 extending within the opening 65 at positions in the bottom of the lower half 62. These projections are for positioning the tape cassette 10 when accommodated. Pins 71 and 72 are respectively embeddedly provided in the above projecting parts 67 and 68, for positioning the tape cassette 10. The opening 65 is open at the bottom surface of the tape cassette 10 accommodated within the accommodating part 61.

Figure 7:
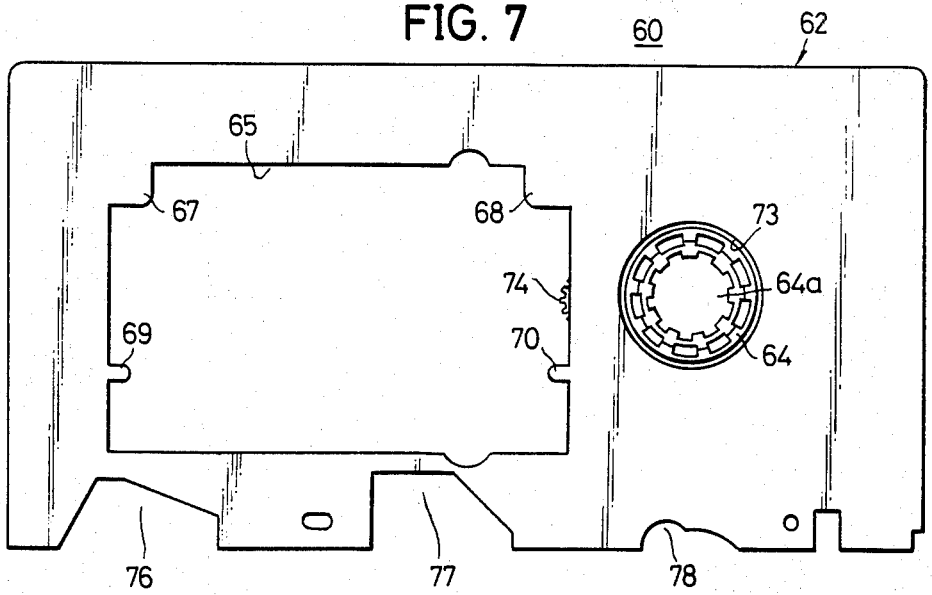
Figure 10:
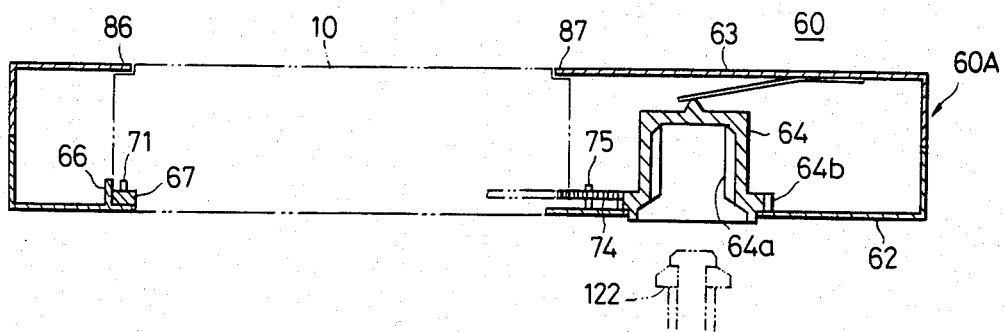
FIG. 10 is a cross-sectional view, with the miniature type tape cassette omitted, showing the adapter along a line X—X in FIG. 9.

The gear structure 64 is provided in a rotatable manner at a position opposing a hole 73 in the lower half 62, as shown in FIGS. 7 and 10. A reel driving shaft inserting part 64a is provided at the inner part of the gear structure 64. Moreover, a gear part 64b is provided at the outer periphery of the above gear structure 64. An intermediate gear 74 having a small diameter meshes with the above gear part 64b. This intermediate gear 74 is axially supported by a shaft 75 on the lower half 62, and a part of the gear 74 protrudes into the above accommodating part 61. Furthermore, the intermediate gear 74 is provided at a height position opposing the outer peripheral edge of the lower flange 27 in the take-up reel 22 within the tape cassette 10 which is accommodated within the accommodating part 61.

Similarly as in the standard type tape cassette, openings 76 and 77 for inserting loading poles, and an opening 78 for inserting the capstan, are respectively provided in the front surface side of the lower half 62.

Furthermore, guide poles 80 and 81 are embeddedly provided at the end of the above opening 76 and at the end of the opening 78, respectively, in the lower half 62. Moreover, a guide pole 82 is embeddedly provided in the lower half 62, at a position opposing the guide pole 30. As will be described hereinafter, the guide poles 80 and 81 guide the magnetic tape 12 so that the magnetic tape 12 forms a tape path 12B along the front surface of the tape cassette adapter 60.

Figure 9:
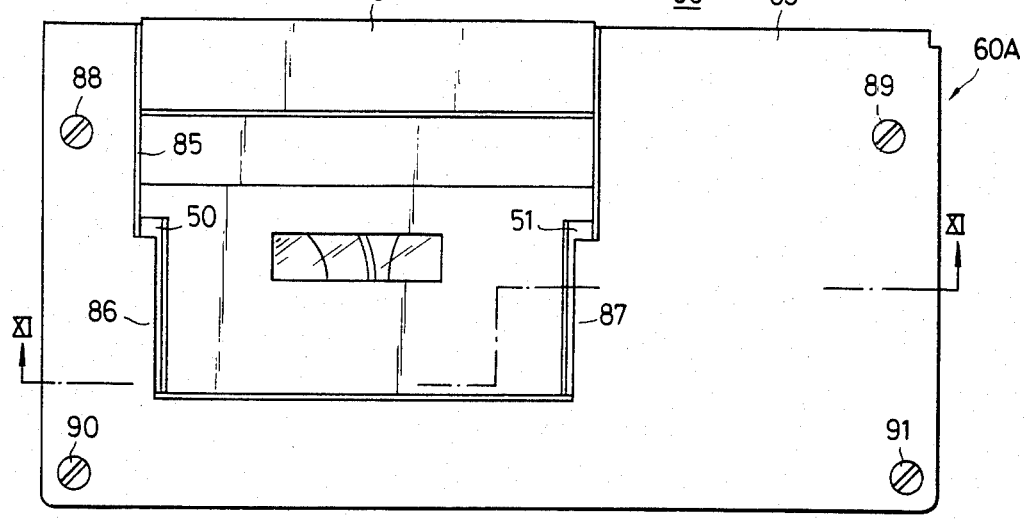
FIG. 9 is a plan view showing the adapter in a state where an upper half if assembled to the lower half of the adapter which is in the state shown in FIG. 8, to accommodate the miniature type tape cassette.

As shown in FIG. 9, the upper half 63 has an U-shaped cutout 85. Inwardly projecting parts 87 and 86 are respectively formed on the right and left sides at the innermost part of the cutout 85.

Next, description will be given to a case where the above tape cassette 10 is independently loaded into a compact type recording and/or reproducing apparatus exclusively designed for the miniature type tape cassette, of a type different from the standard type recording and/or reproducing apparatus, such as a compact recording and/or reproducing apparatus of a type smaller than the standard type recording and/or reproducing apparatus, for example, by referring to FIG. 11.

Figure 11:
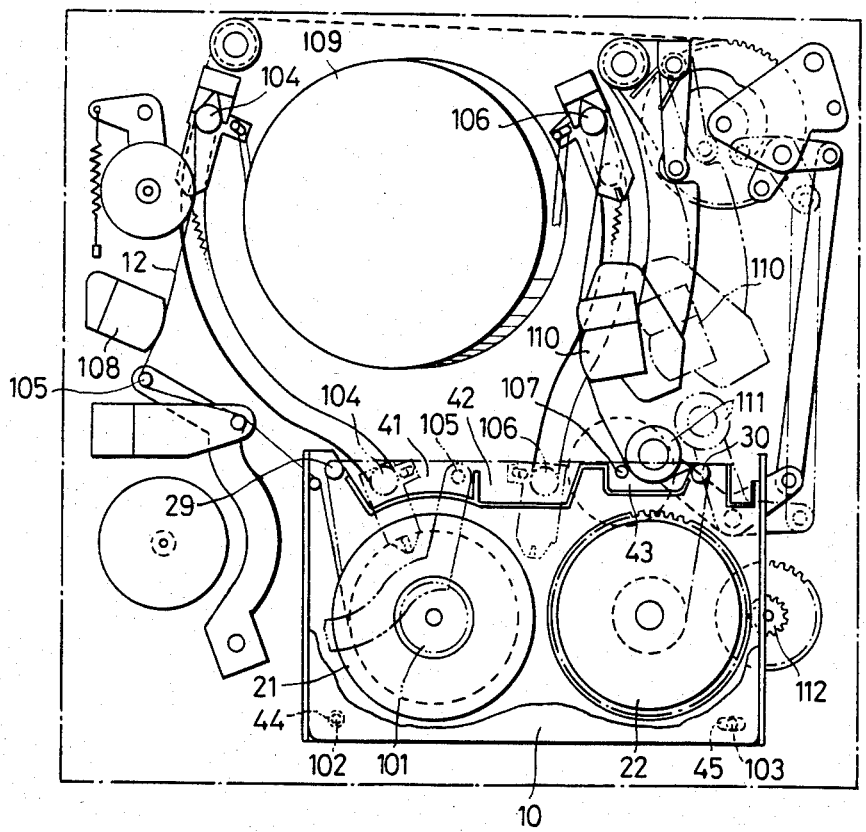
FIG. 11 is a plan view showing an example of a recording and/or reproducing apparatus exclusively for the miniature type tape cassette which operates together with the miniature type tape cassette shown in FIG. 1A, in a state where the miniature type recording and/or reproducing apparatus is in a recording or reproducing mode.

FIG. 11 shows a compact type recording and/or reproducing apparatus 100. The width and depth of this compact type recording and/or reproducing apparatus 100 are smaller than those of a standard type recording and/or reproducing apparatus 120 shown in FIG. 12, and the size of the compact type recording and/or reproducing apparatus 100 as a whole is small.

A supply reel driving shaft 101 is provided at a cassette loading part of the above compact type recording and/or reproducing apparatus 100, however, a take-up reel driving shaft is not provided. When the tape cassette 10 is loaded into the compact type recording and/or reproducing apparatus 100, the support reel 21 is fitted over the supply reel driving shaft 101, in a positioned state where the hole 44 and the longitudinal hole 45 are fitted over pins 102 and 103. In addition, a loading pole 104 and a tension pole 105 relatively enter within the opening 41, while a loading pole 106 and a capstan 107 respectively and relatively enter into the opening 42.

In the above loaded state, the supply reel 21 is pushed upwards as shown in FIG. 3. Hence, the teeth 24b disengages from the teeth 32, and the supply reel 21 becomes freely rotatable. Moreover, the braking member 38 is pushed upwards against the forces exerted by the springs 40a and 40b, by the pin 103 inserted into the longitudinal hole 45. The finger portion 38b rises and the level of the finger portion 38b becomes different from that of the gear part 27a, to disengage from the gear part 27a. Accordingly, the take-up reel 22 is also released from the locked state, and becomes freely rotatable.

When the operational mode of the recording and/or reproducing apparatus is set to a play mode, the above poles 104, 105, and 106 intercept and engage with the magnetic tape 12 to draw out the magnetic tape 12, and respectively move to positions indicated by solid lines in FIG. 11. Hence, the magnetic tape 12 is drawn out of the tape cassette 10, to make contact with a full-width erasing head 108. The magnetic tape 12 further makes contact with a guide drum 109 provided with rotary video heads through out a predetermined angular range, and also makes contact with an audio control head 110. Thus, the magnetic tape 12 is loaded onto a predetermined tape travelling path. During recording and reproduction, the magnetic tape 12 is driven in a state pinched between the capstan 107 and a pinch roller 111. Moreover, a driving gear 112 which is rotated by a reel driving motor (not shown) meshes with the gear part 27a of the take-up reel 22, and the take-up reel 22 is accordingly driven towards a tape take-up direction.

The full-width erasing head 108, the audio control head 110, and the guide drum 109 are constructed under the same standard as corresponding heads and guide drum of the standard type recording and/or reproducing apparatus which will be described hereinafter. Accordingly, a signal is recorded onto and reproduced from the magnetic tape 12 with a tape pattern and format identical to those obtained by the standard type recording and/or reproducing apparatus.

Next, description will be given for a case where the above tape cassette 10 is used by loading the tape cassette 10 into the standard type recording and/or reproducing apparatus, by referring to FIG. 12.

In this case, the tape cassette 10 is accommodated within the tape cassette adapter 60 to form the above described predetermined tape path within the tape cassette adapter 60. This tape cassette adapter 60 accommodating the tape cassette 10 is loaded into the recording and/or reproducing apparatus as in the case where the standard type tape cassette is loaded.

In order to accommodate the tape cassette 10 within the tape cassette adapter 60, the front lid portion 16 of the tape cassette 10 is first opened as indicated by a two-dot chain line in FIG. 1B. Then, the magnetic tape 12 is drawn out from the tape cassette 10 by a predetermined length. In this state, the take-up reel 22 is in a locked state and does not rotate. However, the supply reel 21 is reluctantly movable when the teeth 24b ride over the teeth 32 against the force exerted by the leaf spring 33. Hence, the magnetic tape 12 is drawn out from the supply reel 21.

Figure 8:
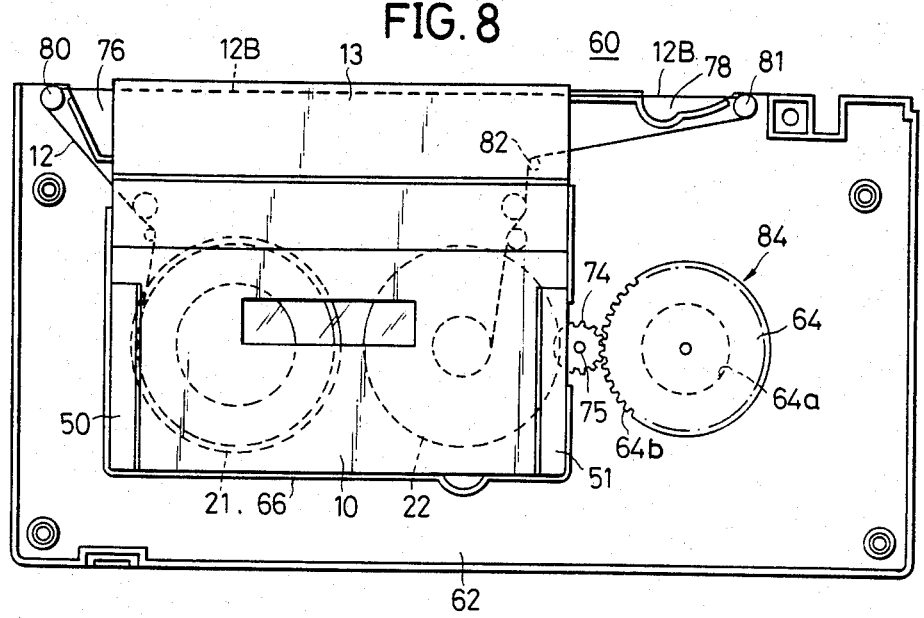
FIG. 8 is a plan view showing a state where the miniature type tape cassette shown in FIGS. 1A through 1D is loaded into the lower half of the tape cassette adapter shown in FIG. 6, and the tape is drawn out from the miniature type tape cassette to form a predetermined tape path.

In the above state, as shown in FIG. 8, the tape cassette 10 is accommodated within the accommodating part 61 in the lower half 62, and the magnetic tape 12 which is drawn out is threaded around the guide poles 80, 81, and 82 so as to be guided by these guide poles. Accordingly, the magnetic tape 12 is guided especially by these guide poles 80 and 81 in particular as shown in FIG. 8, and forms the tape path 12B traversing the front surface of the openings 76, 77, and 78, as in the case of the standard type tape cassette. This tape path 12B is substantially identical to the tape path on the inner part at the front surface of the standard type tape cassette. Then, the upper half 63 is placed over the lower half 62 as shown in FIG. 9, and these upper and lower halves 62 and 63 are connected to each other by screws 88 through 91. Therefore, as shown in FIGS. 9 and 10, the tape cassette adapter 60 accommodates the tape cassette 10 therein, in a state where the magnetic tape 12 is drawn out from the tape cassette 10 and guided along the predetermined tape path 12B.

Next, description will be given with respect to the operation of each parts, when the tape cassette 10 is accommodated within the tape cassette adapter 60.

The tape cassette 10 is placed from above and accommodated within the accommodating part 61. In this state, the depressions 46 through 49 provided at the bottom of the tape cassette 10 respectively fit over the projections 67 through 70 of the lower half 62 to position the tape cassette 10 with respect to the height direction. The peripheral side walls of the tape cassette 10 oppose the wall part 66 of the lower half 62. Furthermore, the hole 44 and the longitudinal hole 45 provided on the lower half 15 of the tape cassette 10 relatively fit over the pins 71 and 72, to position the tape cassette 10 within the accommodating part 61 with respect to the right and left directions. The pin 72 in particular relatively passes through the longitudinal hole 45 as shown in FIG. 6, to push the braking member 38 upwards against the forces exerted by the coil springs 40a and 40b. That is, the braking member 38 is pushed upwards along the axial direction of the take-up reel 22. Hence, similarly as in the case described above, the finger portion 38b of the braking member 38 disengages from the gear part 27a towards the upward direction, to release the locked take-up reel 22. At the same time, the intermediate gear 74 relatively enters within the cutout window 37 from below, to mesh with the gear part 27a. The intermediate gear 74 may be constructed to undergo slight movement so that the intermediate gear 74 meshes with the gear part 27a without difficulty. The lid 13 makes contact with a rib part 83 formed along the openings 76 and 77 of the lower half 62, and is maintained in a state closing the openings.

The upper half 63 of the tape cassette adapter 60 is mounted to the lower half 62 in a state where the inwardly projecting parts 86 and 87 respectively engage with the depressions 50 and 51 provided on the upper surface of the tape cassette 10. Hence, the tape cassette 10 is pushed by the projections 67 through 70 of the lower half 62 and by the inwardly projections 86 and 87 of the upper half 63. The tape cassette 10 is thus positioned with respect to the direction of the thickness thereof, so that the tape cassette 10 does not slip out from the accommodating part 61. Furthermore, the tape cassette 10 is accommodated within the accommodating part 61 in a state where the upper surface and bottom surface of the tape cassette 10 lie in substantially the same planes as the upper surface and bottom surface of the tape cassette adapter 60.

FIG. 12 shows the standard type recording and/or reproducing apparatus 120. The above tape cassette adapter 60 accommodating the tape cassette 10 therein, is loaded into the standard type recording and/or reproducing apparatus 120 in a similar manner as in the case where the standard type tape cassette is loaded. That is, when the above tape cassette adapter 60 is loaded into the standard type recording and/or reproducing apparatus 120, a supply reel driving shaft 121 is inserted into the reel driving shaft inserting part 25a of the supply reel 21, and a take-up reel driving shaft 122 is inserted into the reel driving shaft inserting part 64a of the gear structure 64 within the tape cassette adapter 60. Furthermore, loading poles 123 and 124 and a capstan 125 respectively enter into the openings 76, 77, and 78 behind the tape path 12B (refer to FIGS. 6 and 8). In addition, in the above loaded state, as in the case of the compact type recording and/or reproducing apparatus 100, the supply reel 21 is pushed upwards as shown in FIG. 3. Accordingly, the locking operation with respect to the supply reel 21 is released, and the supply reel 21 becomes freely rotatable. As described above, the take-up reel 22 is released from the locked state and is already in a freely rotatable state, in the state where the tape cassette 10 is accommodated within the tape cassette adapter 60.

Upon a tape loading operation, the above loading poles 123 and 124 respectively intercept and engage with the magnetic tape 12, then draw the magnetic tape 12 out of the cassette as the loading poles 123 and 124 move away from the openings 76 and 77, and reach positions indicated by solid lines in FIG. 12. Accordingly, the magnetic tape 12 which is drawn ouside the tape cassette adapter 60, makes contact with a full-width erasing head 126, and makes contact with a guide drum 127 provided with rotary video heads throughout a predetermined angular range. The magnetic tape 12 further makes contact with an audio control head 128. Therefore, the above magnetic tape 12 loaded onto a predetermined tape travelling path.

During recording and reproduction, the magnetic tape 12 is driven in a state pinched between a capstan 129 and a pinch roller 125. Moreover, the gear structure 64 within the tape cassette adapter 60 is rotated in the clockwise direction by the take-up reel driving shaft 122. This rotation of the gear structure 64 is transmitted to the take-up reel 22 through the intermediate gear 74, to drive the magnetic tape 12 towards a tape take-up direction. Accordingly, the magnetic tape 12 fed out by the capstan 129 is taken-up by the take-up reel 22. The magnetic tape 12 is guided by the guide poles 81 and 82 within the tape cassette adapter 60.

In either case where the above tape cassette 10 is independently loaded into the compact type recording and/or reproducing apparatus 100 or the tape cassette 10 is loaded into the standard type recording and/or reproducing apparatus 120 in a state accommodated within the tape cassette adapter 60, the supply reel 21 fits over the supply reel driving shaft 101 (121) provided in the recording and/or reproducing apparatus, and the supply reel 21 is directly driven. Hence, the rotational accuracy of the supply reel 21 becomes high, and a highly accurate tape feeding operation can be obtained, Moreover, since the diameter d1 of the reel hub 25 in the supply reel 21 is large, the difference between the maximum and minimum diameters of the roll of the wound-tape on the above supply reel 21 is relatively small. Accordingly, the varying range of the rotational speed of the supply reel 21 from the start to the completion of recording and reproduction is small, and the tape running accuracy is improved.

On the other hand, with respect to the take-up reel 22, the take-up reel 22 is not fitted over the take-up reel driving shaft in either case where the above tape cassette 10 is independently loaded into the compact type recording and/or reproducing apparatus 100 or the standard type recording and/or reproducing apparatus 120 in a state accommodated within the tape cassette adapter 60. Thus, to a given size of the cassette, an amount of tape to be accommodated can be increased, or the size of the cassette case 11 can be reduced to a given amount of tape. The above take-up reel 22 is indirectly driven from the side of the cassette case 11 through the gear structure 64 and the intermediate gear 74. However, since there is no strict requirements in the rotational accuracy of the take-up reel 22, no drawbacks are introduced. Further, as the take-up reel 22 rotates without play around the fixed shaft 34, no extra space is required around the reel, and this helps to reduce the size of the tape cassette.

When the tape cassette 10 is unloaded from the loading part of the compact type recording and/or reproducing apparatus 100, the supply reel 21 and the braking member 38 respectively move downwards. Thus, the supply reel 21 and the take-up reel 22 are both automatically locked so as not to rotate. Moreover, when the tape cassette 10 is removed from the tape cassette adapter 60, after the tape cassette adapter 60 is unloaded from the loading part of the standard type recording and/or reproducing apparatus 120, the braking member 38 similarly moves downwards to lock the take-up reel 22.

When the tape cassette 10 is unloaded from the loading part of the compact type recording and/or reproducing apparatus 100, the supply reel 21 and the braking member 38 respectively move downwards. Thus, the supply reel 21 and the take-up reel 22 are both automatically locked so as not to rotate. Moreover, when the tape cassette 10 is separated from the tape cassette adapter 60, after the tape cassette adapter 60 is unloaded from the loading part of the standard type recording and/or reproducing apparatus 120, the braking member 38 similarly moves downwards to lock the take-up reel 22.

Next, description will be given with respect to another embodiment of an adapter for a miniature type tape cassette, by referring to FIGS. 13 through 18. In FIGS. 13 through 18, those parts which are the same as those corresponding parts in FIGS. 1A through 10 are designated by like reference numerals, and their description will be omitted.

First, description will be given with respect to a miniature type tape cassette which can be applied to the above embodiment of an adapter, by referring to FIGS. 13 through 16.

A miniature type tape cassette 140 is the same as the above described tape cassette 10 except for the construction in the periphery of a lower flange of a take-up reel 141.

A lower flange 142 of the take-up reel 141 has a flat surface from the inner periphery to the outermost periphery thereof, and is provided with a gear part 142a at the outer peripheral surface thereof. This gear part 142a engages with the braking member 38, to lock the take-up reel 141 so as not to rotate as in the case of the above tape cassette 10.

A gear part 142b is provided at the lower surface of the lower flange 142. A diameter d3 of this gear part 142b is smaller than the diameter of a lower flange 142, and is substantially equal to the diameter of the reel hub 28. This diameter d3 is smaller than the diameter of the corresponding gear part 27a in the tape cassette 10 shown in FIG. 3, and for example, is set to a value which is approximately one-half the diameter of the above gear part 27a.

A gear 143 for transmitting rotation which is axially supported by a pin 144, is provided on the lower half 15. This gear 143 is arranged and provided at a position on the lower side of the lower flange 142. One end side of the gear 143 meshes with the above gear part 142b while the other end side is exposed through the cutout window 37 in the lower half 15, with respect to one diametrical direction of the gear 143. The diameter of this gear 143 is substantially equal to the diameter of the above gear part 142b.

Figure 17:
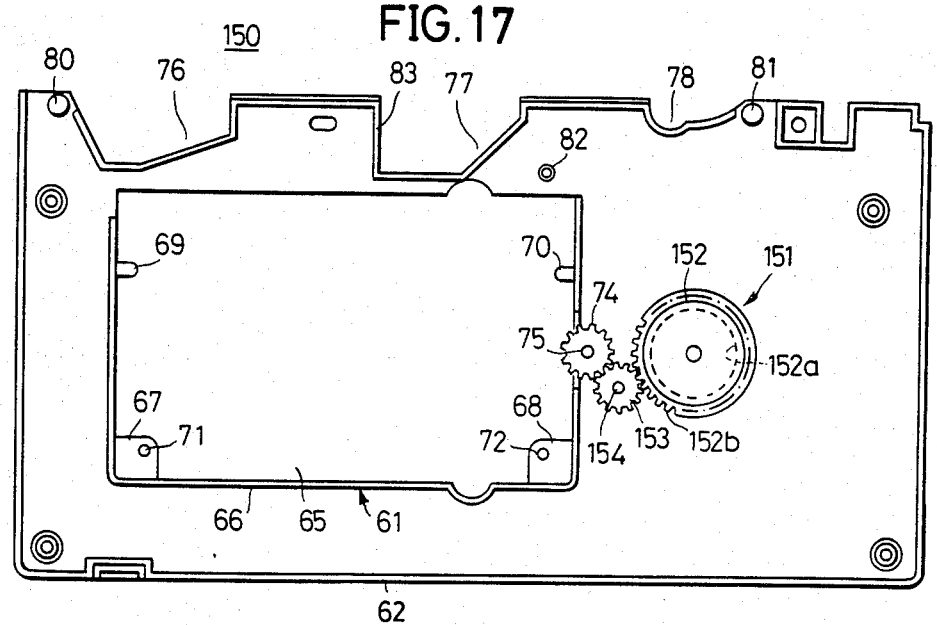
FIG. 17 is a plan view showing a lower half of another embodiment of an adapter according to the present invention wherein the miniature type tape cassette shown in FIG. 13 is accommodated.
Figure 18:
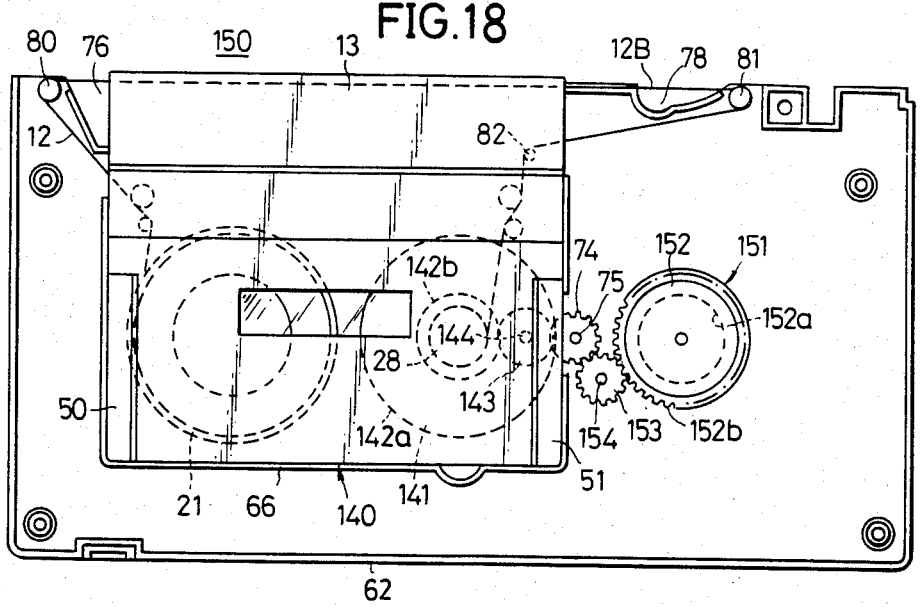
FIG. 18 is a plan view showing a state where the miniature type tape cassette shown in FIG. 13 is accommodated within the lower half shown in FIG. 17.

Next, description will be given with respect to an adapter capable of accommodating the above tape cassette 140, by referring especially to FIGS. 17 and 18.

A tape cassette adapter 150 for the miniature type tape cassette is assembled from the lower half 62 and the upper half (not shown) to form an adapter case as in the above described tape cassette adapter 60.

Instead of the above rotation transmitting mechanism 84, a rotation transmitting mechanism 151 is assembled in the lower half 62. This rotation transmitting mechanism 151 consists of a gear structure 152, a gear 153, and the intermediate gear 74. The gear structure 152 in the above rotation transmitting mechanism 151 has a reel inserting hole 152a into which the take-up reel driving shaft is inserted, at the inner part thereof, and a gear part 152b formed at the peripheral surface thereof. A gear 153 is axially supported by a pin 154 provided on the lower half, in a state where the gear 153 meshes with the above gear part 152b and the intermediate gear 74. The intermediate gear 74 is provided at a height position opposing the gear 143 within the tape cassette 140 accommodated within the accommodating part 61.

The tape cassette 140 is accommodated within a tape cassette adapter in a similar manner as in the case of the above tape cassette 10. FIG. 18 shows a state where the tape cassette 140 is accommodated in the lower half 62 of the tape cassette adapter 150. The tape cassette 140 is positioned and accommodated within the tape cassette adapter 150 in a state wherein the gear 143 meshes with the intermediate gear 74. As shown in FIG. 12, the tape cassette adapter 150 accommodating the tape cassette 140 therein, is loaded into the standard type recording and/or reproducing apparatus 120. During recording and reproducing modes, the gear structure 152 engages with the take-up reel shaft 122 (refer to FIG. 10) and rotates in the clockwise direction.

This rotation of the gear structure 152 is transmitted to the gear part 142b, by way of the gears 153, 74, and 143. Hence, the take-up reel 141 rotates in the clockwise direction, to take-up the magnetic tape 12 around the reel hub 28. Here, the reel hub 28 must be rotated at a predetermined rotational speed, so that slack is not introduced in the magnetic tape 12 which is successively fed when the magnetic tape 12 is taken-up. On the other hand, since the diameter d2 of the reel hub 28 in the above take-up reel 141 is small, the value for the above predetermined rotational speed becomes a high value. However, in the present embodiment of the invention, the diameter d3 of the gear part 142b of the take-up reel 141 is small. Accordingly, the small-diameter gears 153, 74, and 143 which are required for rotating the take-up reel 141 at the above predetermined rotational speed, need only be rotated at considerably low rotational speeds compared to the case of the first embodiment of the invention. Therefore, the rotation transmitting mechanism system can operate in a stable manner, and long serviceable life of the system can be assured.

Furthermore, since the diameter d3 of the gear part 142b of the take-up reel 141 is small, the take-up reel 141 can be rotated at a high rotational speed without subjecting the rotation transmitting mechanism system to an excessive load. Thus, the diameter of the reel hub 28 in the take-up reel 141 can further be reduced, and the tape cassette 140 accordingly becomes capable of winding and accommodating a larger quantity of tape.

In addition, in relation to the gear 143 provided within the tape cassette 140, the gear 153 is provided within the tape cassette adapter 150. Hence, the take-up reel 141 rotates towards the same direction as the take-up reel shaft 122, and the take-up reel 141 winds the tape in a manner similar to that performed by the take-up reel of the standard type tape cassette. This is also true with respect to the above described tape cassette 10.

In a case where the tape cassette 140 is loaded into the compact type recording and/or reproducing apparatus 100, the gear 143 meshes with the driving gear 112 of the compact type recording and/or reproducing apparatus 100. In this case, the driving gear 112 rotates towards a direction opposite to that when the compact type recording and/or reproducing apparatus 100 is loaded with the tape cassette 10. However, the take-up reel 141 is rotated towards the clockwise direction as in the case where the tape cassette adapter is used, through the gear 143.

In each of the above embodiments of the invention, instead of providing the gear part at the peripheral side surface of the lower flange 27 of the take-up reel 22 within the tape cassette 10, and providing a rotation transmitting pulley instead of the gear 143 in the tape cassette 140, a rubber roller may be used in the rotation transmitting mechanism within the tape cassette adapters according to the above first and second embodiments of the invention. In this case, the rotation is transmitted to the take-up reel 22 within the tape cassette 10, and to the rotation transmitting pulley within the tape cassette 140, by use of the friction introduced therebetween.

Moreover, the gear part at the periphery of the lower flange of the take-up reel 22 in the tape cassette 10 may be formed as a bevel gear part. In this case, a bevel gear provided on a horizontal shaft of the tape cassette adapter 60 or the side of the apparatus, relatively enters through an opening on the bottom surface side of the tape cassette of the cutout window 37 provided in the tape cassette 10. Accordingly, the bevel gear meshes with the above bevel gear part of the lower flange, in a state where the bevel gear crosses the lower flange 27 in a perpendicular manner.

Further, the present invention is not limited to these embodiments, but various variations and modifications may be made without departing from the scope of the present invention.

What is claimed is:

1. An adapter for a miniature type tape cassette which comprises a cassette case, supply side and take-up side reels and a tape accommodated within said cassette case, said cassette case having an external form and size which is smaller than the external form and size of a standard type tape cassette, axes of said supply side and take-up side reels being separated by a distance which is shorter than a distance between axes of two reels of said standard type tape cassette, said miniature type tape cassette also being used independently of said adapter when used with a recording and/or reproducing apparatus of a type which is different from a standard type recording and/or reproducing apparatus, said adapter comprising:

an adapter case having an external form and size which is substantially equal to the external form and size of said standard type tape cassette so that the adapter may be loaded into said standard type recording and/or reproducing apparatus;

an accommodating part in said adapter for accommodating said miniature type tape cassette; and stationary tape guide pole means fixed on said adapter case for guiding the tape after it has been manually drawn out of the miniature type tape cassette accommodated within the adapter case and threaded over said guide pole means, said stationary guide pole means supporting said tape along a predetermined tape path within said adapter case which corresponds to a tape path in said standard type tape cassette.

2. An adapter as claimed in claim 1 in which said stationary tape guide pole means is located at a position which guides said tape along a tape path part across the inner part at the front surface of said adapter, said predetermined path of said tape within said adapter being substantially equal to a corresponding tape path part on the inner side and at the front surface of said standard type tape cassette.

3. An adapter as claimed in claim 1 in which said accommodating part has an opening at the bottom surface of said adapter case so that when said adapter accommodating said miniature type tape cassette is loaded into the standard type recording and/or reproducing apparatus, one reel of the supply side reel and the take-up side reel of said miniature type tape cassette directly engages one reel driving shaft of said standard type recording and/or reproducing apparatus.

4. An adapter as claimed in claim 3 further comprising a rotation transmitting mechanism provided within said adapter case for transmitting rotation by engaging another reel driving shaft of said standard type recording and/or reproducing apparatus when said adapter is loaded into said standard type recording and/or reproducing apparatus, said other reel driving shaft being different from said one reel driving shaft, in which said rotation transmitting mechanism transmits rotation to the other of said supply side reel and to said take-up side reel of the miniature type tape cassette accommodated within said accommodating part.

5. An adapter as claimed in claim 4 in which said rotation transmitting mechanism comprises a rotary member engaging said other reel driving shaft, and an intermediate rotary body for transmitting the rotation of said rotary body to the other reel of said miniature type tape cassette.

6. An adapter as claimed in claim 5 in which said other reel has a gear part rotating unitarily therewith, and said intermediate rotary body comprises a gear wheel meshing with said gear part.

7. An adapter as claimed in claim 6 in which said gear part of the other reel is formed at the outer peripheral edge of a reel flange, and said gear wheel is provided at a height position corresponding to the outer peripheral edge of said reel flange.

8. An adapter as claimed in claim 5 in which said gear part of the other reel is formed at the lower surface of a reel flange and is of a diameter which is smaller than the diameter of said reel flange, said miniature type tape cassette has a rotation transmitting gear wheel meshing with said gear part, and said gear wheel of the adapter is provided at a height position to mesh with said rotaion transmitting gear wheel of the miniature type tape cassette.

9. An adapter as claimed in claim 4 in which said one reel is the supply side reel, said other reel is the take-up side reel, and said rotation transmitting mechanism transmits rotation to the take-up side reel.

10. An adapter as claimed in claim 4 in which said miniature type tape cassette further has a braking member making contact with the peripheral edge part of a flange of said other reel for braking said other reel, and urging means for urging said braking member downwardly, said braking member being displaced upwardly to separate from the peripheral edge part of said reel flange and release the braking operation, said cassette case having a hole in its lower surface at a position opposing said braking member, and said adapter further comprises:

a first pin-shaped member located in said accommodating part of the adapter at a location where said pin-shaped member is inserted through the hole in said cassette case when said miniature type tape cassette is accommodated within said accommodating part for displacing said braking member upwardly against the force of said urging means in order to release the braking operation.

11. An adapter as claimed in claim 10 and projections and depressions formed in said accommodating part of said adapter to cooperate with corresponding projections or depressions on said cassette case for locating said cassette case in said adapter.

12. An adapter as claimed in claim 1 in which said miniature type tape cassette has a normally closed lid at the front surface of said cassette case, the lid being free to open and close, wherein said adapter further comprises:

said accommodating part being located at a position where said miniature type tape cassette is accommodated therein when said lid is open and said open lid does not project outside said adapter case.

13. An adapter as claimed in claim 12 wherein said cassette case further has another hole on its lower surface which forms a pair with said hole, and said adapter further comprises:

another pin-shaped member in said accommodatng part to form a pair with said first pin-shaped member, said pair of pin-shaped members being inserted into said pair of holes when said miniature type tape cassette is positioned within said accommodating part.

14. An adapter as claimed in claim 1 in which said adapter case has an upper case half and a lower case half, and said upper and lower case halves being assembled together to secure said miniature type tape cassette in said accommodating part.

15. An adapter as claimed in claim 1 in which said adapter case has an upper case half and a lower case half which may be assembled together, and said miniature type tape cassette being inserted into and extracted from said accommodating part when said upper and lower case halves are disassembled.

* * * * *